(12) United States Patent
Wach et al.

(10) Patent No.: US 12,420,695 B2
(45) Date of Patent: Sep. 23, 2025

(54) STAKE POCKET UTILITY SYSTEM

(71) Applicants: Ryan Robert Wach, Valencia, CA (US); William Littell Everitt, III, Valencia, CA (US)

(72) Inventors: Ryan Robert Wach, Valencia, CA (US); William Littell Everitt, III, Valencia, CA (US)

( * ) Notice: Subject to any disclaimer, the term of this patent is extended or adjusted under 35 U.S.C. 154(b) by 782 days.

(21) Appl. No.: 17/689,815

(22) Filed: Mar. 8, 2022

(65) Prior Publication Data
US 2022/0289099 A1    Sep. 15, 2022

Related U.S. Application Data

(60) Provisional application No. 63/207,635, filed on Mar. 15, 2021.

(51) Int. Cl.
*B60P 7/08*    (2006.01)
*B62D 33/02*    (2006.01)

(52) U.S. Cl.
CPC ........ *B60P 7/0807* (2013.01); *B62D 33/0207* (2013.01)

(58) Field of Classification Search
CPC ........................... B60P 7/0807; B62D 33/0207
USPC .................................. 410/106, 110, 116, 149
See application file for complete search history.

(56) References Cited

U.S. PATENT DOCUMENTS

| | | | |
|---|---|---|---|
| 4,607,991 A * | 8/1986 | Porter ................... | B60P 7/0807 403/252 |
| 5,444,897 A * | 8/1995 | Gross .................... | B60P 7/0807 24/265 CD |
| 6,669,418 B1 * | 12/2003 | Lin ........................ | B60P 7/0807 410/116 |
| 10,189,510 B1 * | 1/2019 | Higgins ............. | B62D 33/0207 |

FOREIGN PATENT DOCUMENTS

JP          H08210335 A  *  8/1996

* cited by examiner

*Primary Examiner* — Amy R Weisberg
*Assistant Examiner* — Philip Charles Adams
(74) *Attorney, Agent, or Firm* — Aaron T. Borrowman; YK Law LLP

(57) ABSTRACT

A stake pocket utility system includes a first assembly detachably connected to a stake pocket, such as stake pockets formed in a wall of a bed of a pickup truck or the like. A second assembly is associated with an accessory and slidably mounted to the first assembly. The first and second assemblies are detachably connected to one another as spring-biased tabs are moved from retracted unlocked positions and into extended locked positions as the tabs align with corresponding locking apertures to detachably lock the first and second assemblies to one another.

18 Claims, 14 Drawing Sheets

STAKE POCKET UTILITY SYSTEM

RELATED APPLICATIONS

This application claims the benefit of U.S. Provisional Application No. 63/207,635, filed on Mar. 15, 2021.

FIELD OF THE INVENTION

The present invention generally relates to the attachment of accessory devices to a stake pocket of a truck, trailer or the like. More particularly, the present invention relates to a stake pocket utility system having a first assembly detachably connected to the stake pocket and a second assembly associated with an accessory device detachably connected to the first assembly resulting in an interchangeable, multi-use stake pocket attachment utility system.

BACKGROUND OF THE INVENTION

It is desirable in the use of a pickup truck to carry and secure various payloads or accessories within, above, and on the sides of a bed of the pickup truck. Stake pockets are a standard feature in full-size pickup trucks and may be found in trailers and other vehicles. A stake pocket of a pickup truck bed is a rectangular or cylindrical hole or a void formed within the material of the side walls of the truck bed with an open top. The original intended use of stake pockets was to hold wooden stakes in order to effectively extend the height of the bed side of the truck for added load carrying height. More recently, it has also desirable to employ stake pockets for alternative uses, such as load tie downs, bed covers and shelves, storage racks, and other accessories.

Pickup truck bed accessory designers and manufacturers have commonly employed methods to fasten truck bed accessories to the vehicle. These often require drilling into the sheet metal of the truck. However, it is desirable to avoid any permanent alterations to the pickup truck bed and sheet metal to install accessory utility devices for storage covers and the like. Moreover, these methods are time consuming, result in difficulty removing the accessory device, and permanently alter and damage the truck.

Other accessory designers have created D-ring or load tie-down loops which clamp onto the top of the sheet metal surface of the sides of the truck bed and plug the stake pocket opening. Such accessories are single purpose, time consuming to remove and limited in strength.

Accordingly, there is a continuing need for a device or system that enables utilization of the stake pocket, such as in pickup truck beds, that does not permanently alter the sheet metal or other material of the vehicle. Such a device or system should be simple to install and easy to remove. Moreover, such a system should offer interchangeable accessories for multiple uses. The present invention fulfills these needs and provides other related advantages.

SUMMARY OF THE INVENTION

The present invention resides in a stake pocket utility system which does not permanently alter the sheet metal or material of the vehicle forming the stake pocket, and is simple to install and easy to remove. The system of the present invention also offers attachment to the stake pocket of interchangeable accessories for multiple uses.

The stake pocket utility system of the present invention generally comprises a first assembly, including a locking member engageable with a stake pocket to detachably connect the first assembly to the stake pocket. A second assembly is slidably mounted to the first assembly. A tab is associated with either the first or second assembly and movable between a retracted unlocked position, as the second assembly is mounted to the first assembly, and in extended locked position as the tab aligns with a corresponding locking aperture of the first or second assembly and extends through the locking aperture to lock the first and second assemblies to one another.

Preferably, the first assembly comprises a hollow tube insertable into the stake pocket. The locking member of the first assembly is movable between a retracted unlocked position and a biased extended locked position. The locking member may comprise a pair of oppositely disposed locking members, each biased outwardly towards a locked position, such as by a leaf spring.

The locking member of the first assembly is moved into a retracted and unlocked position as the locking member engages a wall or rim of the stake pocket. Typically, the locking member has a sloping wall or face which engages the wall or rim of the stake pocket. The locking member of the first assembly moves into an extended and locked position when an upper ledge of the locking member engages the wall or rim of the stake pocket, connecting the first assembly to the stake pocket. The first assembly includes a manually actuated release that unlocks the first assembly from the stake pocket, such as by retracting the locking member out of engagement with the wall or rim of the stake pocket.

Preferably, the second assembly also comprises a tube which is insertable into the hollow tube of the first assembly. Typically, the tab is associated with the second assembly and moved from the retracted position, as the second assembly is inserted into the first assembly, to the extended and locked position as the tab aligns with the corresponding locking aperture of the first assembly. The tab may be spring biased outwardly towards the locked position.

The tab may comprise a pair of oppositely disposed tabs. These may be connected to a leaf spring. The tab may comprise spaced apart first and second sets of tabs. The first and second sets of tabs each comprise oppositely disposed spring-biased tabs. The first and second set of tabs are typically associated with the second assembly. The first assembly typically includes first and second sets of spaced apart apertures configured to respectively receive the first and second set of tabs therein.

The second assembly may include a manually actuated latch that unlocks the first and second assemblies from one another. This may be, for example, by means of retracting the one or more tabs out of the corresponding one or more locking apertures so that the first assembly can be lifted and removed from its attachment with the second assembly.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a stake pocket utility system which is used to detachably connect accessories to a stake pocket, such as those commonly found in the side walls of a bed of a pickup truck, trailers, and in other vehicles. It is desirable to have an easily removable accessory that allows for utilization of existing stake pockets, for example in pickup trucks, as owners and users of such vehicles require many and varied uses for the truck or vehicle. The present invention is designed to enable interchangeable and multi-use accessories to be attached to the vehicle without permanent alteration of the vehicle, as is the case in the prior art. The system 100 of the present invention expands the singular intended use of rarely acknowledged stake pockets into potential many-fold applications and uses previously unavailable to users.

Figure 1:
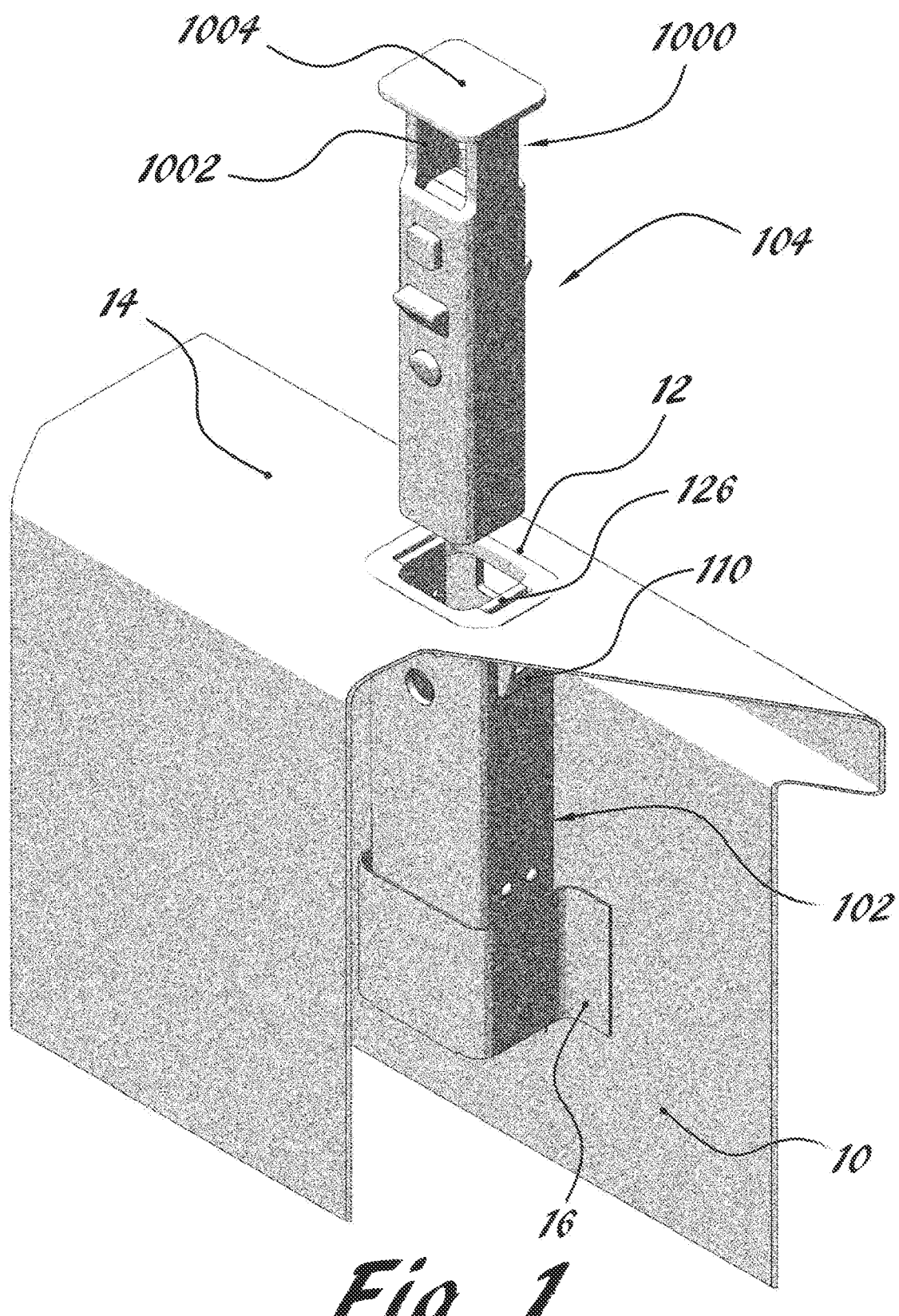
FIG. 1 is a partially exploded and cut-away perspective view illustrating a stake pocket utility system attached to a stake pocket, in accordance with the present invention.

With reference now to FIG. 1, a side wall 10 of a pickup truck or other vehicle, such as defining a bed of a pickup truck, is shown. The side wall 10 is partially cut away to illustrate a stake pocket formed therein, including an open faced or exposed aperture 12 formed in a top rim 14 of the side wall and an internal stake pocket feature, such as a lower bracket 16. It will be appreciated by those skilled in the art that the stake pocket may have different configurations depending upon the manufacture of the truck, trailer or other vehicle. In some instances, a generally tubular wall extends downwardly from the open-faced aperture 12 for a predetermined length. In other instances, the stake pocket may be formed integrally with the side wall 10 or other portion of the vehicle. As mentioned above, stake pockets formed in pickup truck beds and trailers and the like form a generally rectangular cylindrical void with an open-faced aperture at a top thereof for receiving stakes or other accessories, as is well known in the art.

In accordance with the invention, as illustrated in FIG. 1, a first assembly, sometimes referred to herein as a base assembly, 102 is connected to the stake pocket. Preferably, the first base assembly 102 is detachably connected to the stake pocket, as will be more fully described herein. A second assembly 104 is detachably connected to the first assembly 102. The second assembly 104 may be slidably mounted to the first assembly 102.

Figure 2:
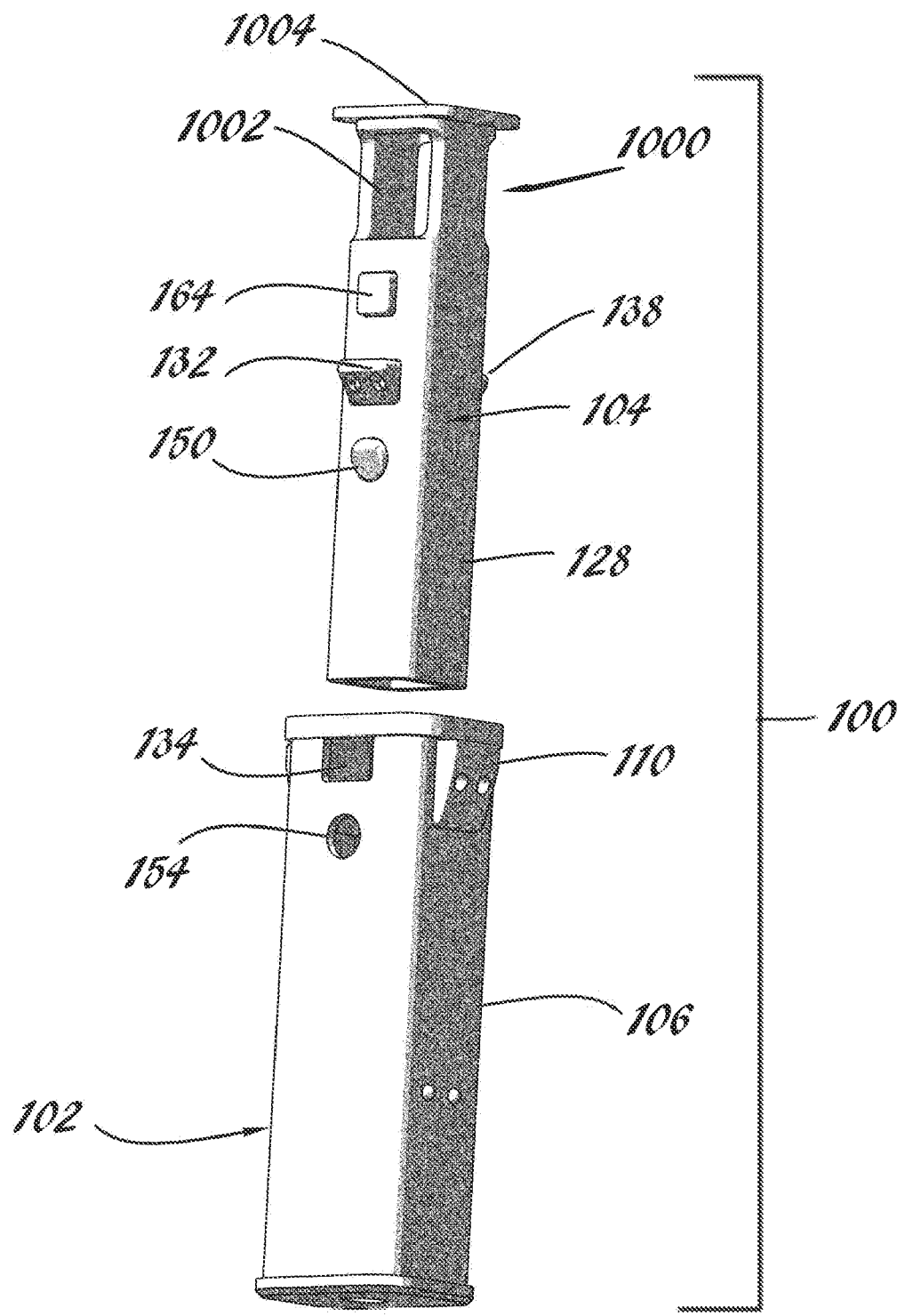
FIG. 2 is an exploded perspective view of a stake pocket utility system embodying the present invention.

As illustrated in FIG. 2, the first assembly 102 may be tubular, such as comprising a hollow tube, and the second assembly 104 may also be tubular and comprise a tube which is slidably insertable into the hollow tube of the first assembly 102 so as to nest therein and/or be telescopically received within the first assembly 102.

Figure 3:
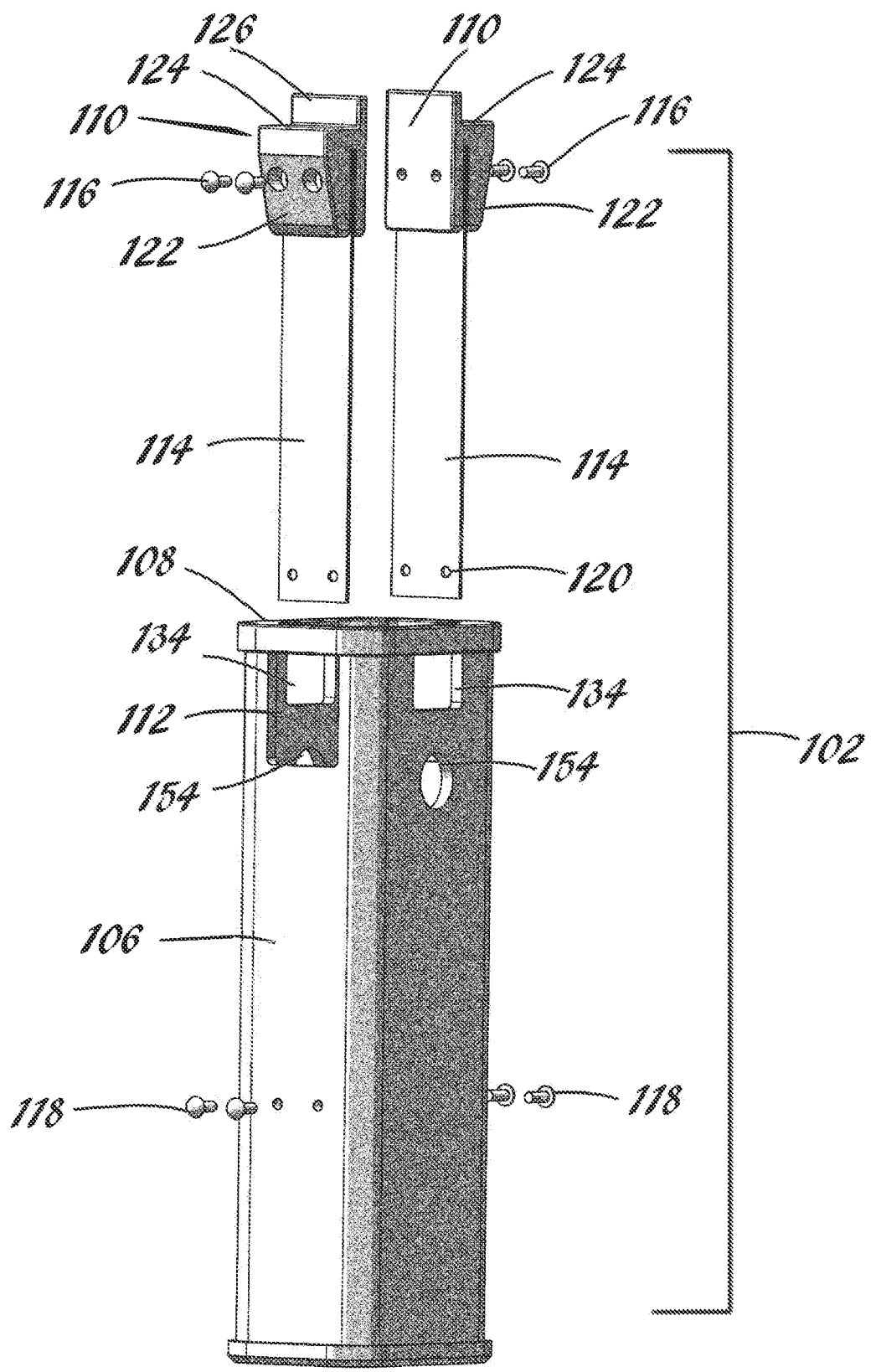
FIG. 3 is an exploded perspective view of a first assembly of the system of the present invention.

With reference now to FIG. 3, the first assembly or base assembly 102 is comprised of a hollow tube 106 having an open end 108. The first assembly 102 includes one or more locking members 110 which are configured to engage with the stake pocket to detachably connect the first assembly to the stake pocket. A locking member window 112 is formed within the tube 106 through which the locking member 110 extends. In the typical case where there is more than one locking member 110, such as the illustrated pair of oppositely disposed locking members 110, such locking member windows 112 are formed in generally opposite sides of the tube 106.

Figure 6:
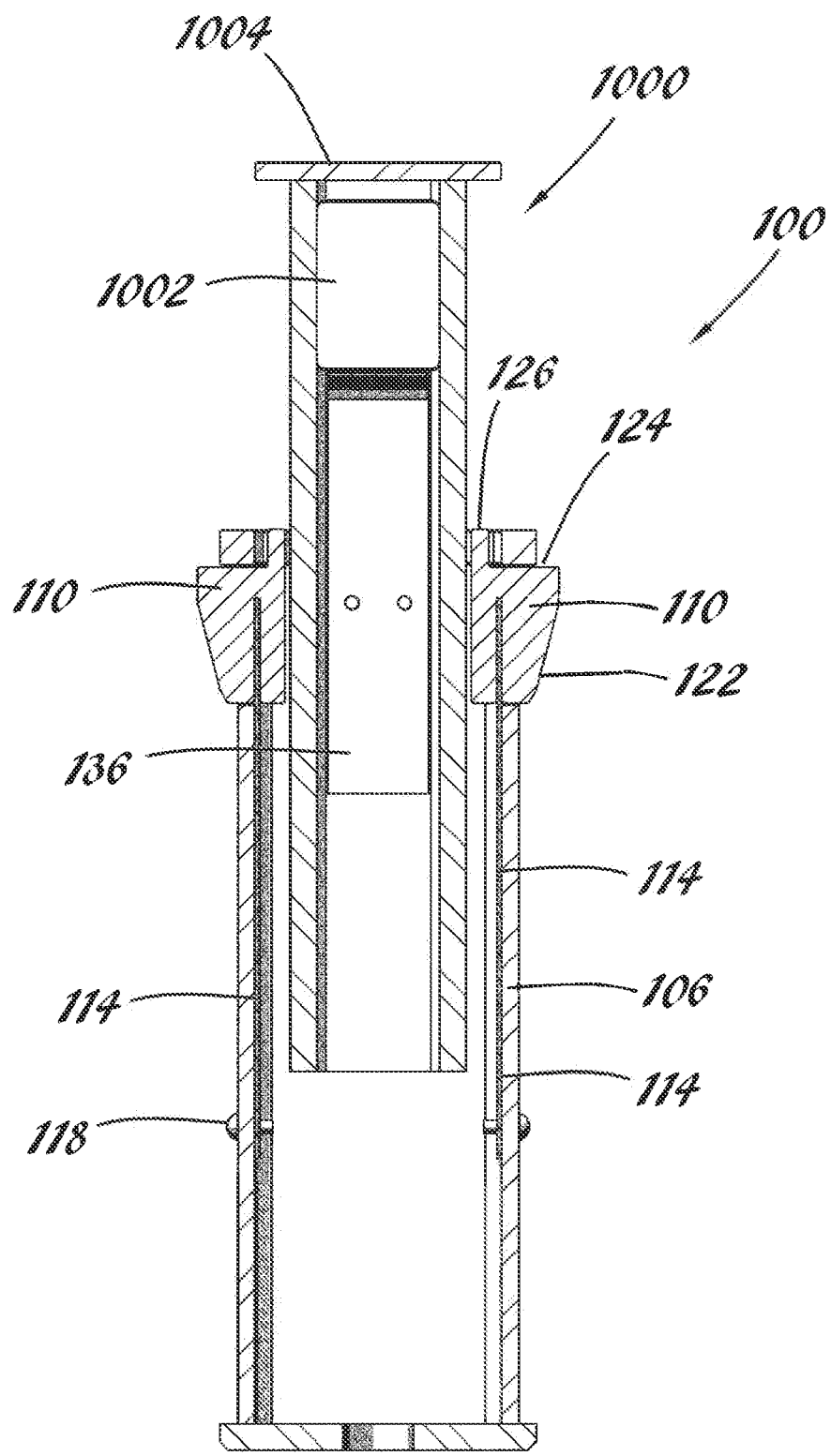
FIG. 6 is a cross-sectional view taken generally along lines 6-6 of FIG. 5.
Figure 7:
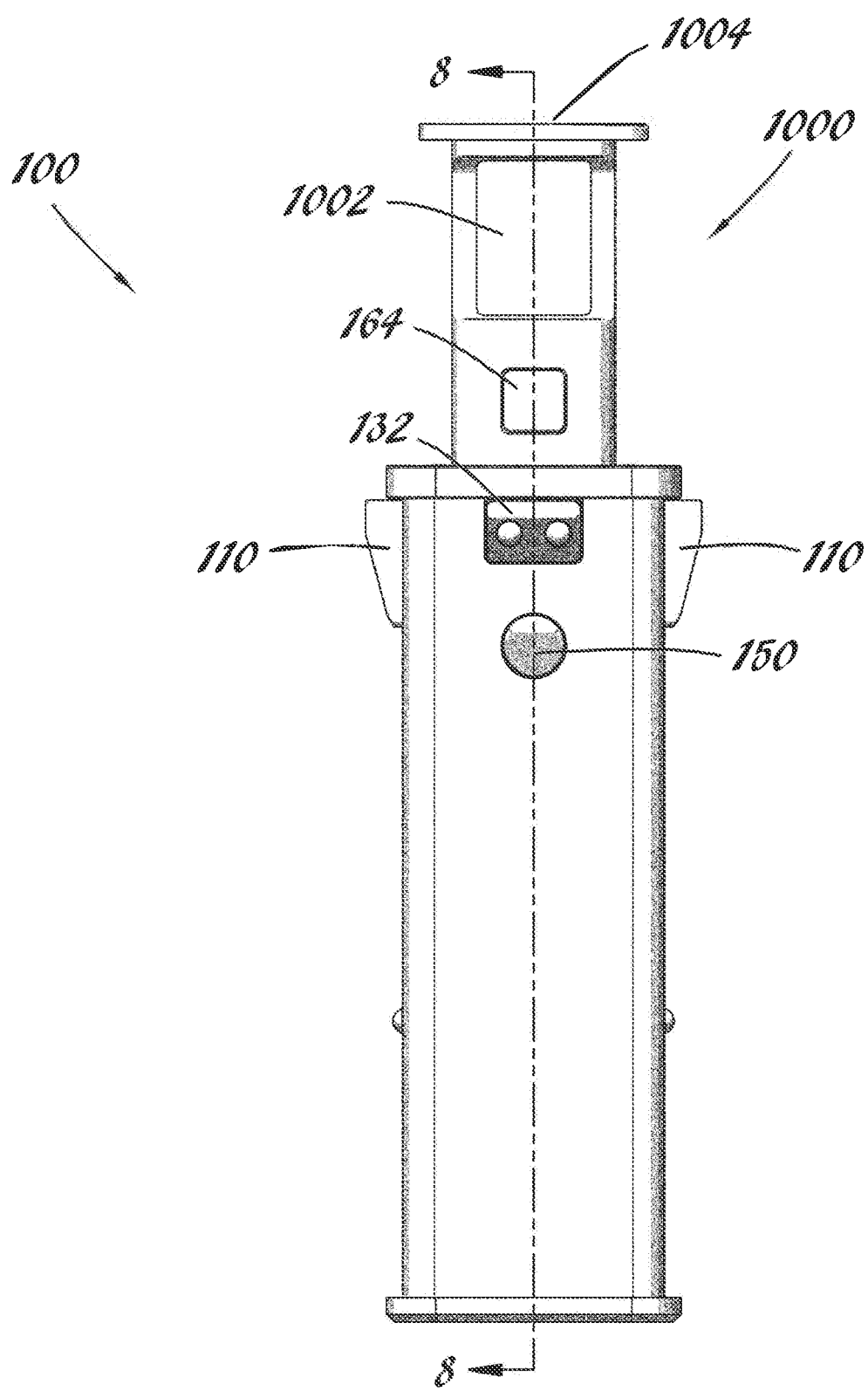
FIG. 7 is a front elevational view of an assembled stake pocket utility system embodying the present invention.

Each locking member 110 is biased, such as being spring-biased, into an extended locked position at least partially extending through the locking member window 112, as illustrated in FIGS. 2, 6 and 7. Such spring biasing may be accomplished, as illustrated, by use of a leaf spring 114 associated with the locking member 110. The locking member 110 may be fastened, such as with fasteners 116 to one end of the leaf spring 114. A generally opposite end of the leaf spring may be attached to the tube 106, such as by means of fasteners 118, which extend through the tube 106 and into apertures 120 formed in the leaf spring 114. In this manner, one end, such as the lower end, of the leaf spring 114 is attached to the tube 106, whereas the opposite end of the leaf spring 114 is attached to the locking member 110, which is able to be moved between a retracted unlocked position as it is moved into the tube 106, and an extended locked position as it extends at least partially outside of the locking member window 112.

Figure 5:
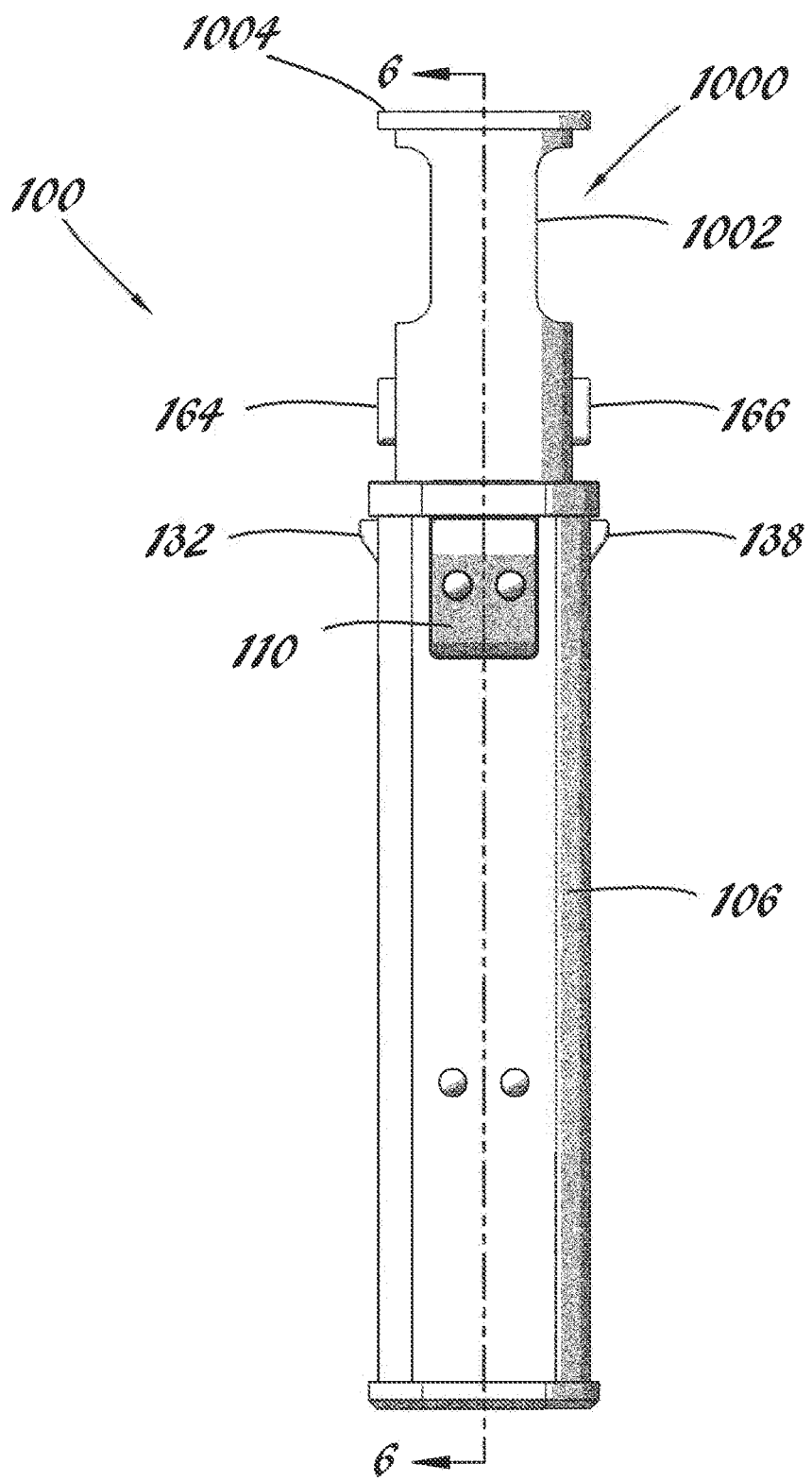
FIG. 5 is a side elevational view of the assembled stake pocket utility system embodying the present invention.

As illustrated in FIGS. 5 and 6, in the illustrated embodiment the leaf springs 114 are disposed within the tube 106 and at least a portion of the locking members 110 extend outwardly from the locking member windows 112. In a particularly preferred embodiment, as illustrated, a pair of locking members 110 and attached leaf springs 114 are oppositely disposed on the tube 106. It will be appreciated, however, that as few as a single biased locking member 110 may be utilized, or multiple locking members 110 to achieve the objectives of the present invention.

In accordance with the invention, the one or more locking members 110 have a configuration so as to be moved and pushed through the locking member window 112 and into the hollow tube 106 into a retracted and unlocked position as the locking member 110 engages an object, such as when the first or base assembly 102 is inserted into a stake pocket. However, once the locking member 110 clears that rim, ledge, wall, or other object of the stake pocket, the locking member 110 is biased outwardly through the locking member window 112 and into an extended locked position to connect the first assembly to the stake pocket. More particularly, in the illustrated embodiment, the locking member 110 includes a sloping wall 122, such as a beveled front face wall of the locking member 110, which slopes outwardly away from the tube 106, such that when the locking member 110 encounters an object, such as a wall or rim of the stake pocket, the locking member 110 is increasingly moved into a retracted position into the tube 106. However, once the locking member 110 clears the wall, rim or other obstruction, it is biased, such as by leaf spring 114, outwardly such that an upper ledge 124, which is preferably generally horizontally planar, is disposed under the rim, wall or other obstruction so as to lock the first assembly in place within the stake pocket. For example, in FIG. 1, it can be seen that the locking member 110 is disposed immediately below the rim 14 surrounding aperture 12 of the stake pocket, such that when the first assembly 102 is fully inserted into the stake pocket the one or more locking members 110 will extend into a locked position placing the ledge 124 immediately below the sheet metal forming the rim 14 of the stake pocket and the upper portion of the side wall 10 of the bed of the pickup truck.

The first or base assembly 102 will remain in a secured and locked position within the stake pocket until it is intentionally removed. This may be by means of manually actuated releases that unlock the first assembly 102 from the stake pocket. Such releases may be in the form of finger holds 126 extending upwardly from the upper ledge 124 of the locking member 110. As a user presses a finger and thumb against the finger hold releases 126, the locking members 110 are manually retracted back into the tube 106, enabling the first assembly 102 to be removed from the stake pocket.

Figure 4:
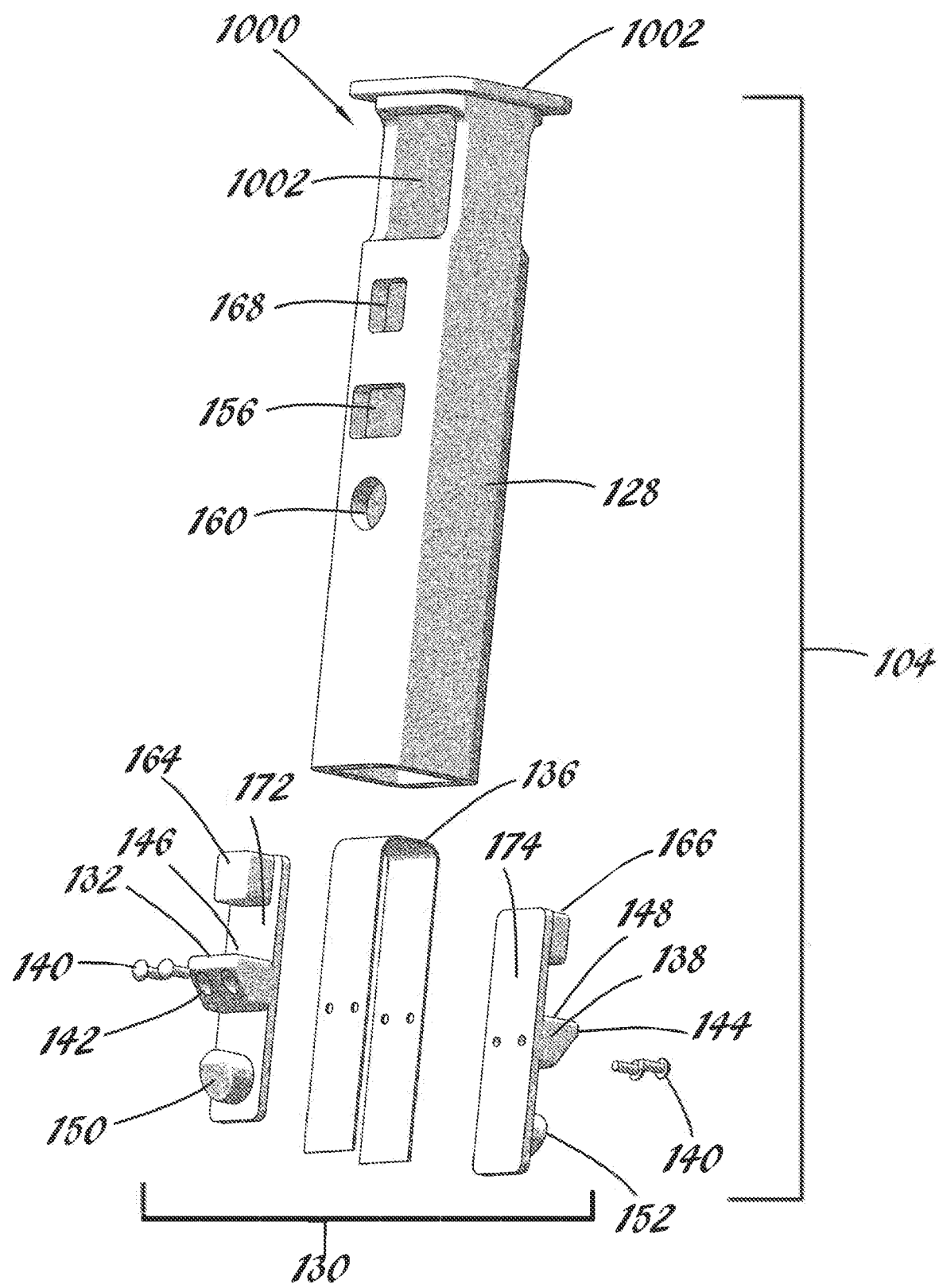
FIG. 4 is an exploded perspective view of a second assembly of the system of the present invention.

With reference now to FIG. 4, an exploded perspective view of the second assembly 104 is shown. As illustrated, the second assembly 104 has a generally tubular configuration and includes a hollow tube 128 which is of a size and configuration so as to be slidably mounted within, in nesting or telescopic fashion, tube 106 of the first assembly. A locking mechanism 130 is disposed within tube 128. The locking mechanism 130 enables the second assembly 104 to be detachably connected to the first assembly. This is done as the second assembly 104 is slidably inserted into the tube 106 of the first assembly 102.

The locking mechanism 130 includes at least one tab 132 which is movable between a retracted unlocked position, as the second assembly 104 is mounted to the first assembly 102, in an extended locked position as the tab 132 aligns with the corresponding locking aperture 134 of the first assembly, and extends through the locking aperture 134 to lock the first and second assemblies 102 and 104 to one another. The tab 132 is spring biased outwardly towards the locked position. This may be done, for example, by means of a leaf spring 136 connected to, or otherwise associated, with the tab 132.

In the illustrated embodiment, the tab comprises a pair of oppositely disposed tabs 132 and 138 connected to a generally U-shaped leaf spring 136. This may be done, for example, by means of fasteners, such as screws, bolts, rivets, or the like or even adhered or welded to the leaf spring 136. The tabs 132 and 138 are extendable through locking apertures 134 formed at generally opposite sides of tube 106. The use of two generally opposed tabs 132 and 138 creates a more secure locking connection between the first and second assemblies 102 and 104.

Locking tabs 132 and 138 may include a sloping or beveled front face 142 and 144, respectively such that as the front faces or walls 142 and 144 come into contact with an object, such as an inner surface of tube 106 of the first assembly 102 the corresponding tab 132 and 138 are increasingly pushed inwardly into tube 128 of the second assembly 104, to enable the tube 128 to be slidably inserted into tube 106 of the first assembly 102. However, when the locking tabs 132 and 138 are aligned with locking apertures 134, the bias of spring 136 pushes them outwardly so as to at least partially extend through the locking apertures 134. The tabs 132 and 138 may include an upper ledge 146 and 148, preferably planar, which then engages with an upper edge defining locking apertures 134 to hold the tabs 132 and 138, and the second assembly 104 in place.

For added secure connection, a second set of tabs 150 and 152 may be spaced apart from the first tabs 132 and 138 and extendable through a second pair of locking apertures 154 formed in the tube 106 of the first assembly 102. These tabs 150 and 152 may have a similar configuration with a beveled or sloping front face and a generally planar or horizontal upper edge so as to facilitate their retraction and locking, as mentioned above with respect to tabs 132 and 138.

Figure 8:
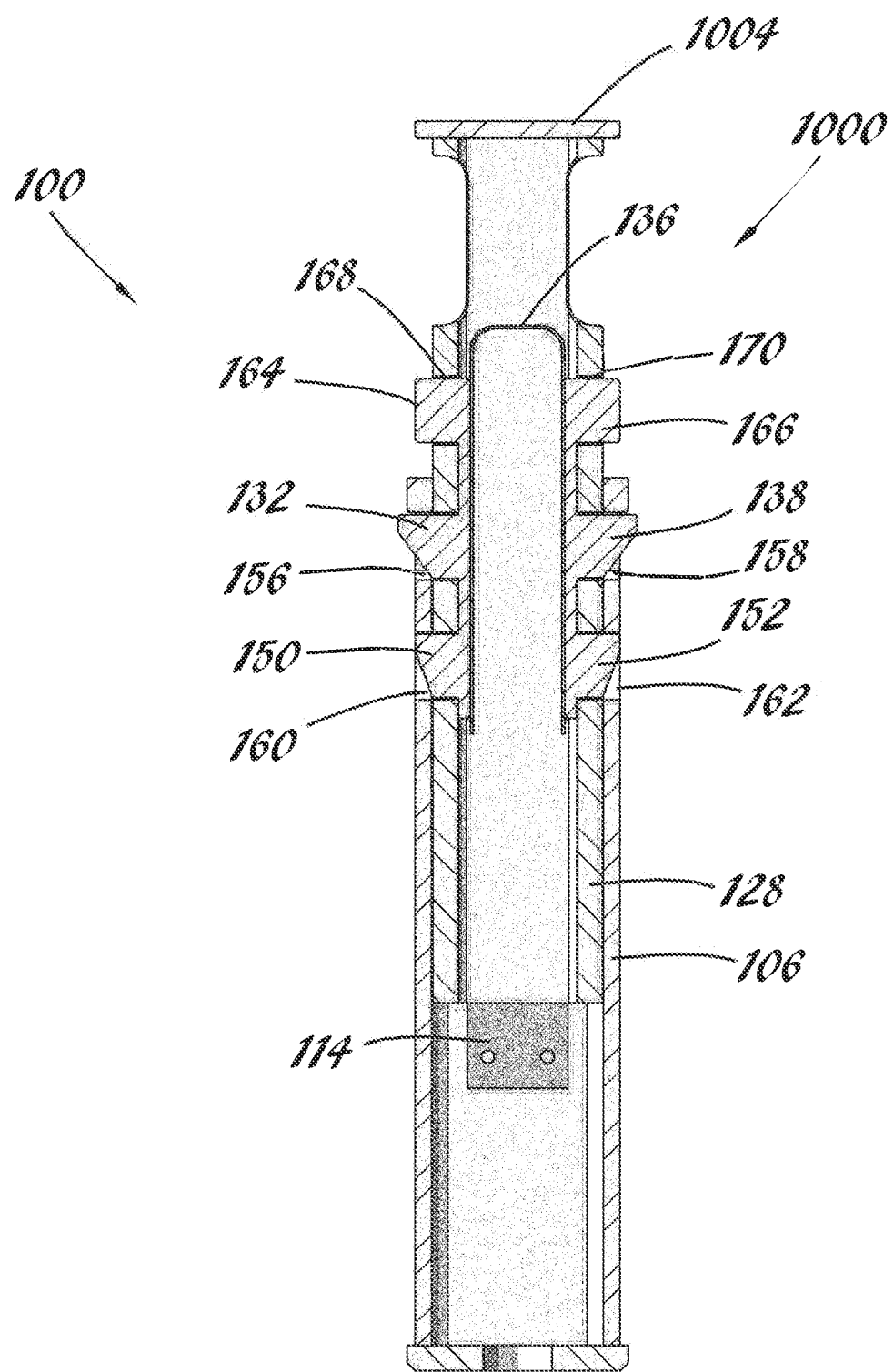
FIG. 8 is a cross-sectional view taken generally along 8-8 of FIG. 7.

The locking mechanism 130 is disposed within tube 128. There are apertures 156-162 formed in tube 128 that are sized and configured to allow tabs 132, 138, 150 and 152 to at least partially pass therethrough as the tabs are retracted in an unlocked position to an extended locked position. These apertures 156-162 will be generally aligned with locking apertures 134 and 154 of the first assembly 102 as the second assembly 104 is fully inserted therein, as illustrated in FIG. 8.

The tabs may have a different configuration which can impart benefits with respect to locking security and symmetrical load distribution. Thus, as can be seen in the various figures, tabs 132 and 138 may have a generally square configuration whereas the second set of tabs 150 and 152 have a generally circular configuration. The locking apertures 134 and 154 have a corresponding square and circular configuration to receive these tabs therethrough. However, it will be understood that the tabs could have the same configuration. Moreover, only a single set of tabs may be used which may be disposed opposite from one another or even placed along the same plane. The use of opposed and oppositely disposed tabs and multiple sets of tabs is intended to provide increased locking and security.

In order to detach and remove the second assembly 104 from the first assembly 102, the one or more tabs must be moved into a retracted and unlocked position so that the second assembly 104 can be pulled upwardly and away from the first assembly 102. The system 100 includes a manually actuated latch that unlocks the first and second assemblies 102 and 104 from one another. In the illustrated embodiment, latches 164 and 166 comprise push buttons which are associated with spring 136, such that as the latches 164 and 166 are depressed inwardly, through apertures 168 and 170 formed in tube 128, the leaf spring 136 is deformed inwardly so as to move tabs 132, 138, 150 and 152 also inwardly into a retracted and unlocked position. Press-button latches 164 and 166 may be respectively attached to members 172 and 174 which are also attached or connected to the tabs 132, 138, 150 and 152. Such members 172 and 174 may have a plate configuration, as shown. It will be understood that tabs 132, 138, 150, 152, latches 164 and 166, and members 172 and 174 may be formed integrally with one another, such as being machined from a single piece of material, formed by molding or the like. In this manner, as any of the generally opposite tabs or latches are depressed or moved into a retracted position, this will cause the remaining tabs or latches to also retract against the bias of spring 136.

In order to install the system 100 of the present invention, the first or base assembly 102 is aligned with the aperture 12 of the stake pocket and pushed in a downward motion into the stake pocket hole. During this installation, locking members 110 engage the rim of the truck bed 14 defining the stake pocket opening 12 and are moved against their spring-biased forces into a retracted position to allow the user to continue to push the first assembly 102 into the stake pocket. Once the first assembly 102 has been inserted into the stake pocket, locking members 110 will be biased outwardly into an extended and locking position, such as below the rim of the stake hole 12 defined by the upper panel 14 of the side wall defining the truck bed. The upper ledge 124 of the locking member 110 is disposed below or engaged with the rim 14, or other object, rim, or ledge within the stake pocket, locking the base assembly 102 in place within the stake pocket.

The second assembly 104, which may be referred to as an attachment assembly, is then slidably inserted into and mounted and detachably connected to the first base assembly 102 by manually pushing it downwardly and into the first assembly 102, wherein tube 128 slides within tube 106, until fully inserted, wherein tabs 132, 138, 150 and 152 are moved from a retracted position, caused by their engagement with the inner wall of tube 106 and to an extended and locked position as they become generally aligned with locking apertures 134 and 154. Once again, their configuration is such so as to extend at least partially through the locking apertures 134 and 154, locking the second attachment assembly 104 to the first base assembly 102 as the second assembly 104 is unable to be lifted upwardly. The first and second assemblies 102 and 104 in an installed and locked position are illustrated in FIGS. 5-8. In such a position, the accessory to which the second assembly, or attachment assembly, 104 extends from, is coupled to, connected to, or formed integrally with is held securely in place on the truck bed, trailer, etc.

To remove the second assembly 104 from the first assembly 102, latches 164 and 166 are manually actuated, such as by being pressed inwardly, causing tabs 132, 138, 150 and 152 to retract inwardly and out of engagement with tube 106 of the first assembly 102. The second or attachment assembly 104 can then be lifted upwardly to remove it, and its associated accessory, from the first assembly 102 and the stake pocket and attachment to the bed of the pickup truck, trailer, or the like.

The first or base assembly 102 can remain within the stake pocket in a locked position so as to receive the second or attachment assembly of another accessory device or when an accessory is reinstalled onto the bed of the pickup truck, trailer or the like. However, if desired, the first assembly 102 may be removed from the stake pocket by manually actuating locking member releases 126, such as by grasping the releases 126 and pinching them inwardly, causing locking members 110 to move into a retracted position and no longer engageable with the rim or other object within the stake pocket which was preventing removal of the first assembly 102, and pulling upwardly on the first assembly 102 to remove it from the stake pocket.

The second assembly 104 may be coupled or otherwise connected to an accessory, removably attached to an accessory, permanently attached to an accessory, or formed integrally with an accessory, such as legs, tubes, bars or the like which would be attached to the truck bed or trailer. As illustrated in FIGS. 1, 2, and 4-10, the accessory 1000 is a load tie-down device. This device 1000 is illustrated as being formed integrally with the second assembly 104, so as to extend upwardly therefrom, although it will be understood that it could be permanently or removably attached to the assembly 104. The tie-down device 1000 includes an aperture 1002 extending therethrough through which ropes, cables or the like may be inserted for attaching an object or other load to the truck bed or trailer or the like. The device 1000 may include a top plate 1004 at an upper end thereof. The upper plate 1004 may be utilized to manually push and install the second attachment assembly 104 to the first base assembly 102, as explained above.

Figure 9:
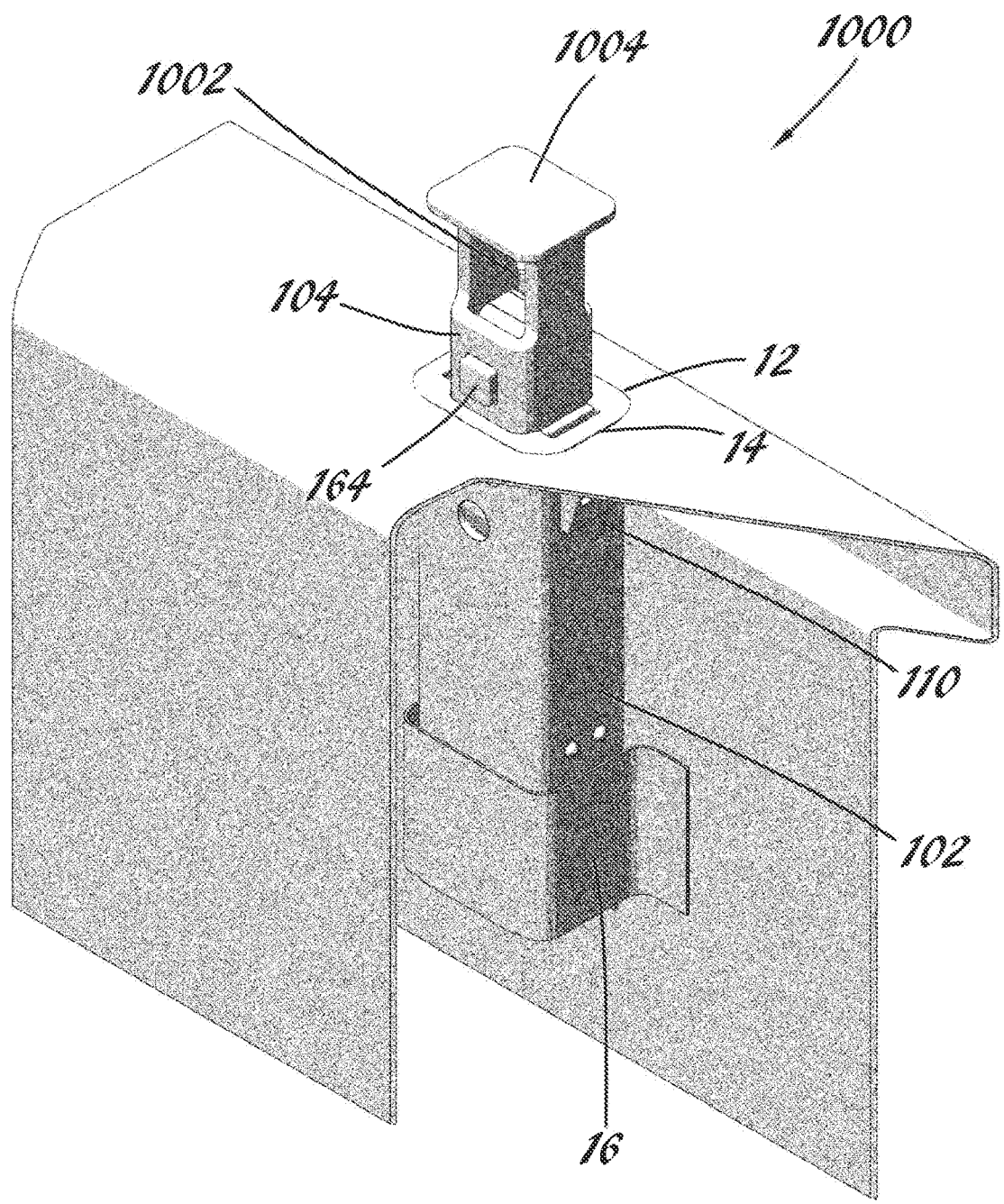
FIG. 9 is a partially cut-away perspective view illustrating a stake pocket utility system embodying the present invention attached to a stake pocket and in an in-use use position.
Figure 10:
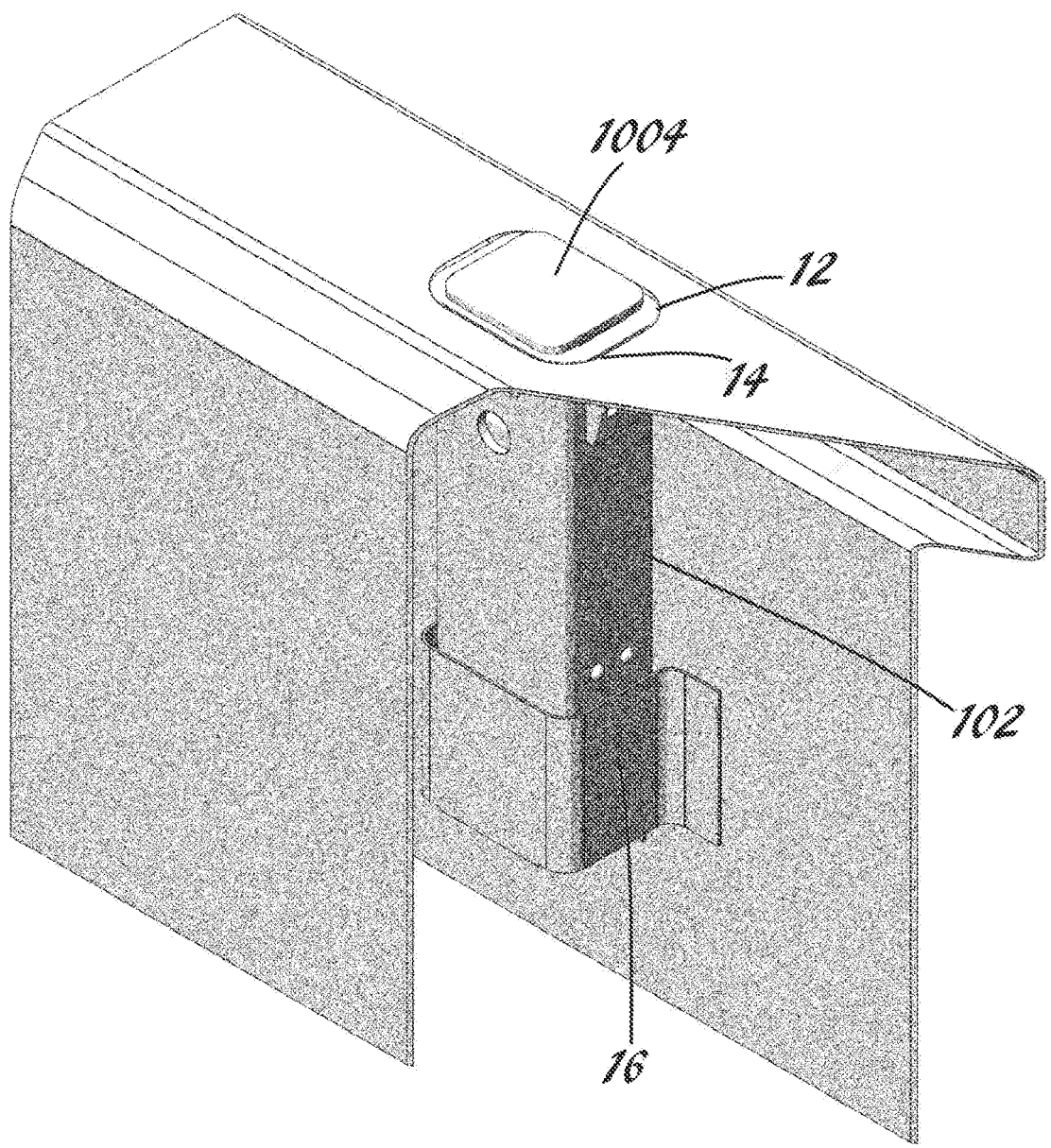
FIG. 10 is a partially cut-away perspective view similar to FIG. 9, but illustrating a second assembly moved into a non-use position, in accordance with the present invention.
Figure 11:
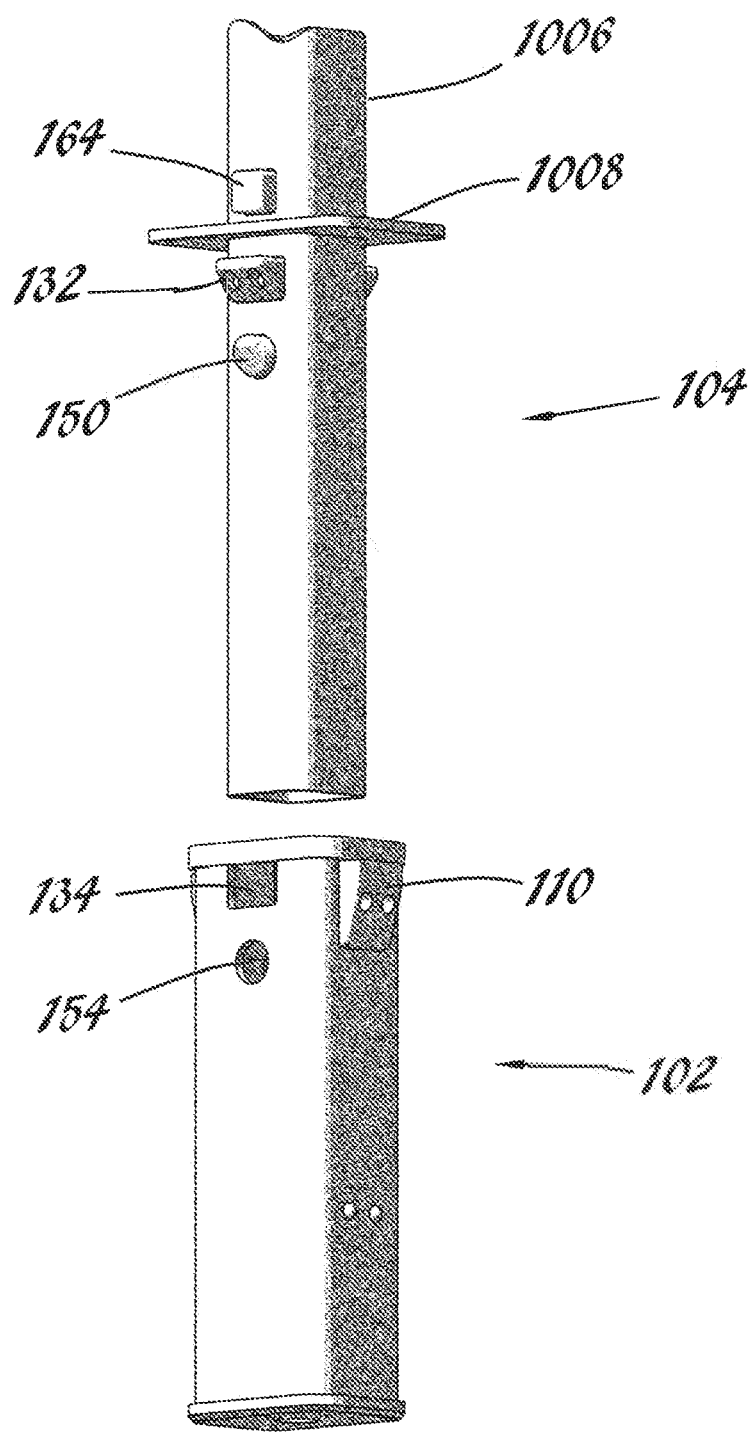
FIG. 11 is a partially fragmented exploded perspective view of a stake pocket utility system embodying the present invention.
Figure 12:
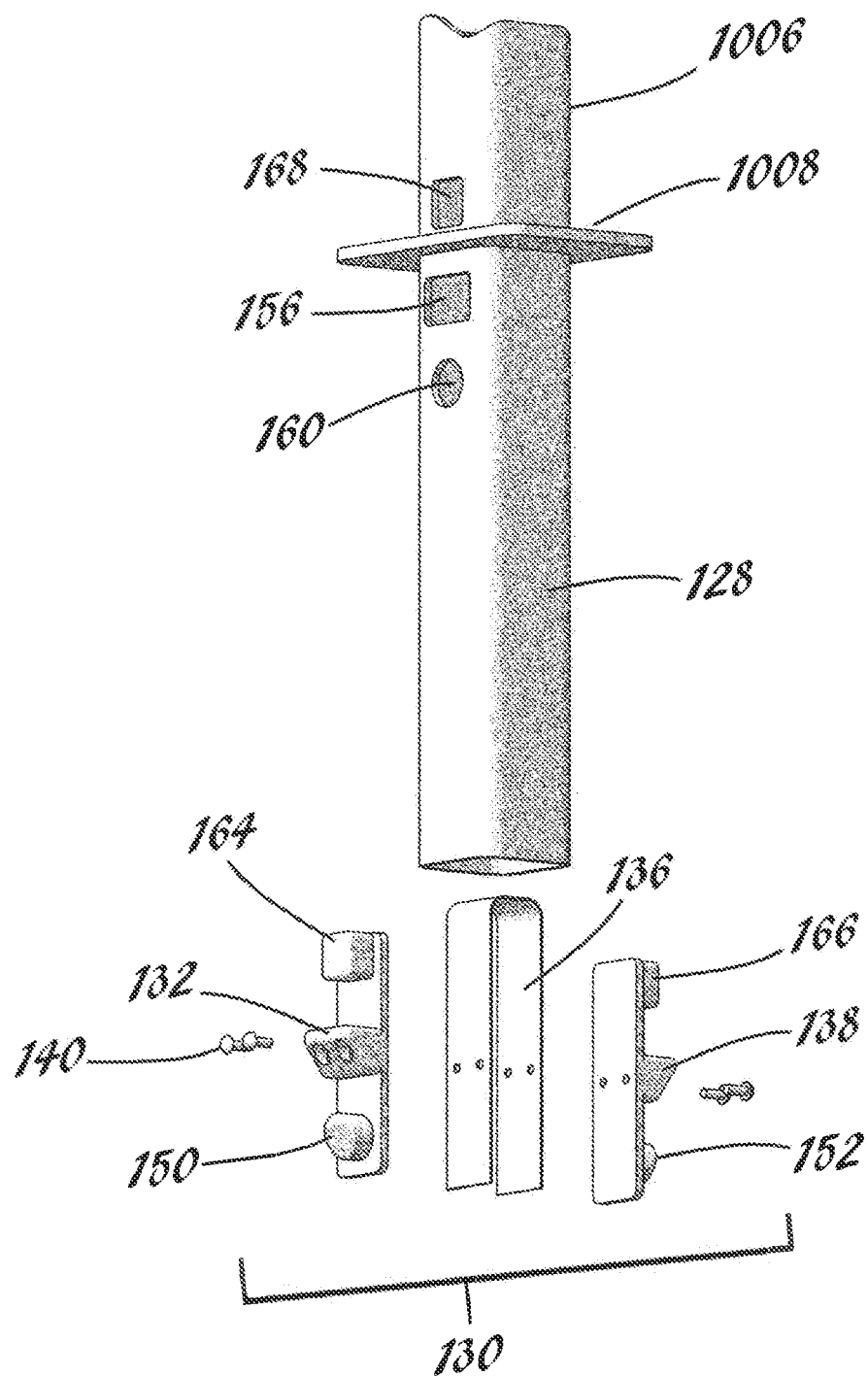
FIG. 12 is an exploded perspective view illustrating component parts of a second assembly of the system of FIG. 11.
Figure 13:
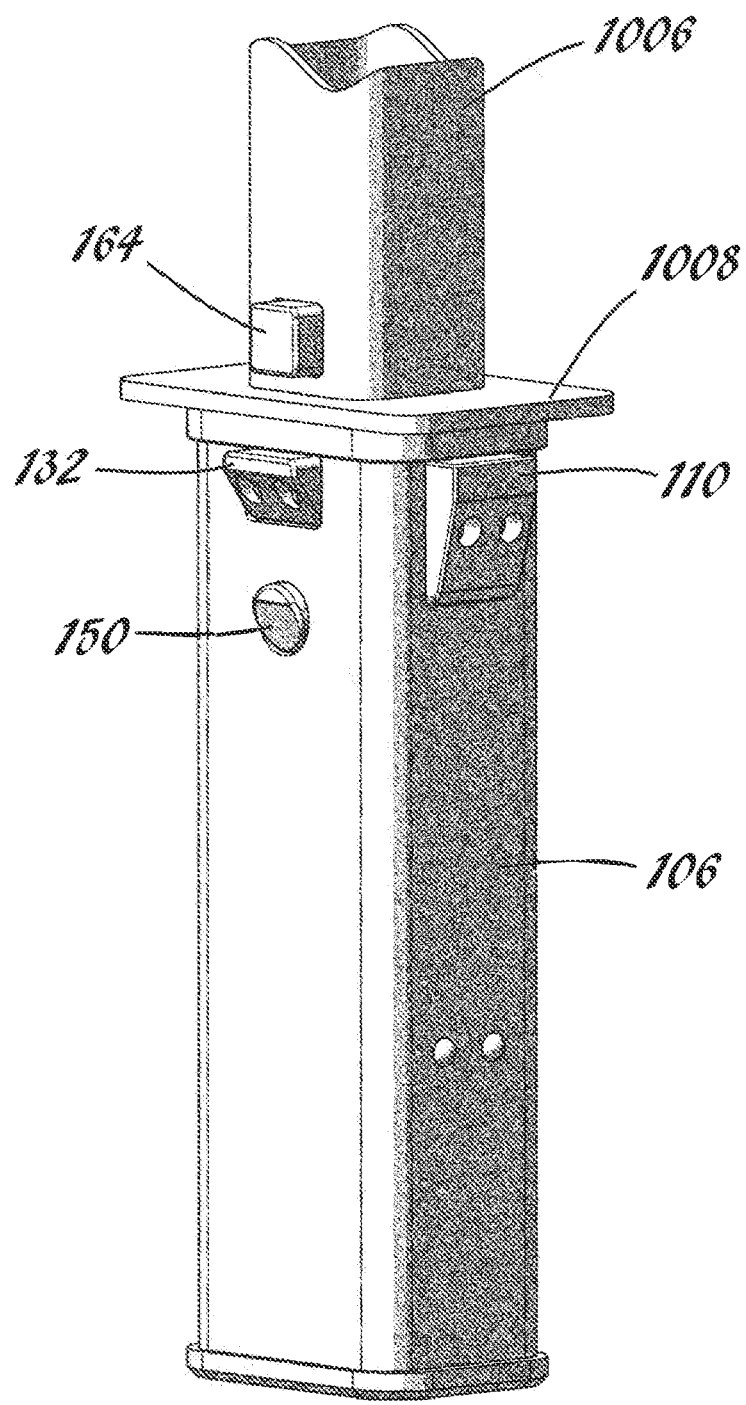
FIG. 13 is a partially fragmented perspective view of the first and second assemblies of FIG. 11 in an assembled state.
Figure 14:
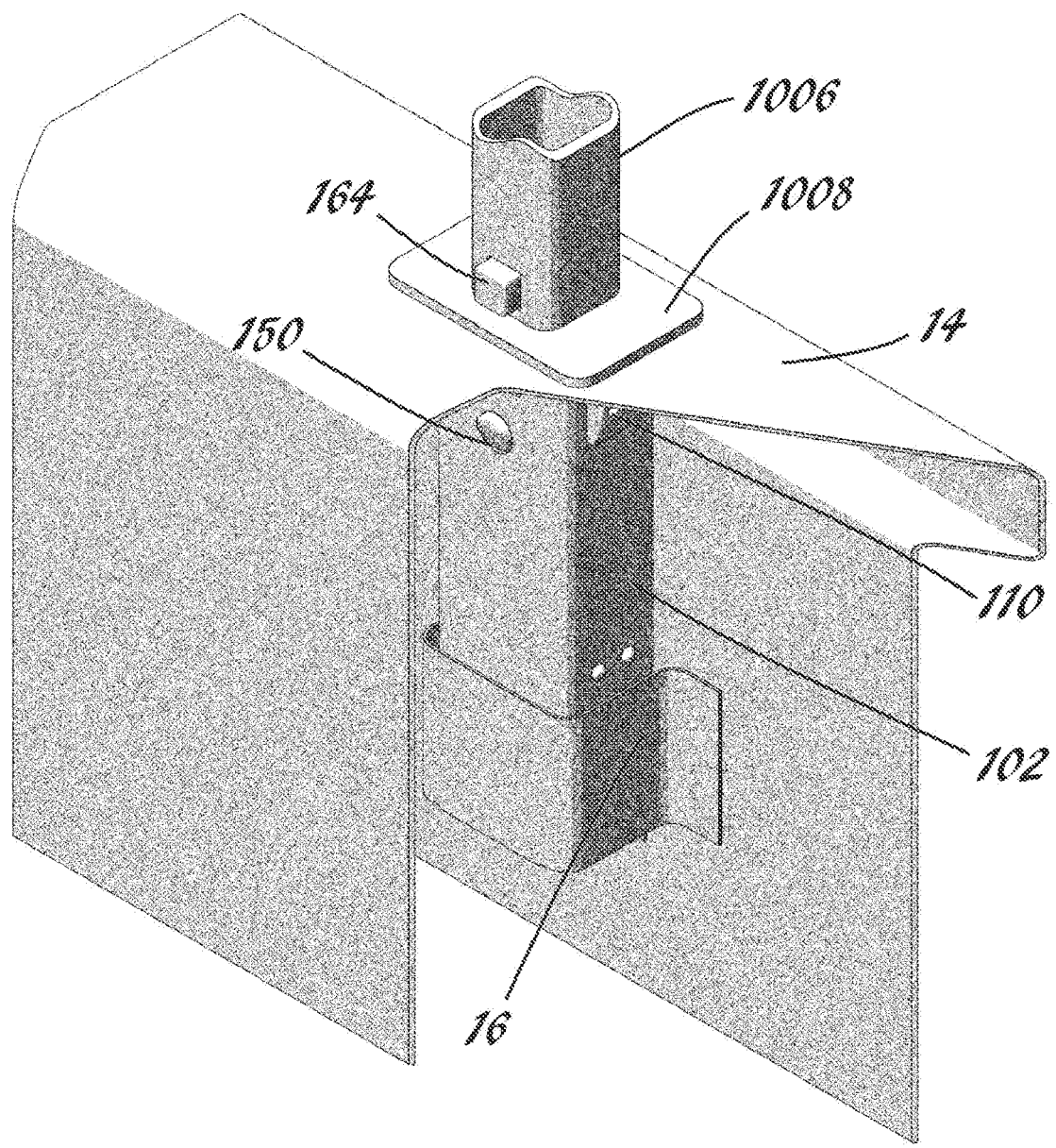
FIG. 14 is a partially cut-away perspective view illustrating the assembled system of FIG. 13 connected to a stake pocket, in accordance with the present invention.

FIG. 9 illustrates the first and second assemblies 102 and 104 operably attached to one another and the stake pocket of a side wall of a bed of a pickup truck. The tie-down member or device 1000 extends above the upper rim 14 of the side wall of the truck so as to provide access for the user to insert ropes, cables, etc. therethrough for tying down objects, etc. When not in use, latches 164 and 166 may be depressed inwardly, and instead of lifting out the accessory 1000 and second assembly 104, the top plate 1004 may be depressed downwardly, causing the second assembly 104 to be pushed farther into the tube 106 of the first assembly 102. In such a position, the plate 104 resides generally parallel with the upper rim 14 of the side wall of the pickup truck. Tabs 132, 138, 150 and 152 remain in a retracted position against an inner wall of tube 106 of the first assembly. Force is required to lift the second assembly 104 and accessory 1000 from the first base assembly 102, which may be accomplished by grasping plate 104 and lifting upwardly. Initially, this may cause the accessory tie-down device 1000 and second assembly 104 to be moved into a locked position, as illustrated in FIG. 9. However, latches 164 and 166 may be depressed in order to fully remove the accessory 1000 and second assembly 104 from the first base assembly 102 and stake pocket.

With reference now to FIGS. 11-14, it will be understood that the second assembly 104 may be coupled to or formed integrally with a variety of accessory devices. Such accessories may include, for example, load tie-downs, bed covers and shells, storage racks, etc. One of the advantages and benefits of the present invention is that it is a multi-use utility system in that an accessory device may be coupled to or formed integrally with the second assembly 104, and thus be detachably connected to the first or base assembly 102 locked within the stake pocket of the vehicle.

Thus, as illustrated in FIGS. 11-14, the top portion of the accessory is cut away from the second assembly 104 and may comprise a multitude of different accessory device and members. The second assembly 104 will continue to be of a tubular shape which is telescopically received into and out of the tube 106 of the first assembly 102. It will continue to have the aforementioned illustrated and described locking tabs and release latches for detachable connection to the first assembly 102.

Tubular extension 1006 may comprise a leg or member of the accessory device attached to or formed integrally with the second assembly 104. Alternatively, extension tube 1006 may extend to a connection point to such an accessory device. Platform 1008 may be attached to or formed with the second assembly 104 for the purpose of resting upon the rim 14 of the side wall of the pickup truck or trailer. Typically, the platform 1008 will be disposed below latches 164 and 166. Platform 1008 may serve various functions, including providing a desirable aesthetic finish to the attached accessory and system, and may also serve functional purposes such as the distribution of weight and forces from the accessory device.

It will be appreciated that the system 100 of the present invention provides many advantages to the currently used stake pocket attached accessories. The system 100 of the present invention enables easy and quick installation of an accessory device to the bed of the pickup truck or trailer or the like. It also enables the interchanging of accessory devices in a very quick and easy manner.

Although several embodiments have been described in detail for purposes of illustration, various modifications may be made without departing from the scope and spirit of the invention. Accordingly, the invention is not to be limited, except as by the appended claims.

What is claimed is:

1. A stake pocket utility system, comprising:
    a first assembly including a locking member engageable with a stake pocket to detachably connect the first assembly to the stake pocket;
    a second assembly slidably mounted to the first assembly;
    the first or second assembly including a tab movable between a retracted unlocked position as the second assembly is mounted to the first assembly and an extended locked position as the tab aligns with a corresponding locking aperture of the first or second assembly and extends through the locking aperture to lock the first and second assemblies to one another; and
    a manually actuated latch that unlocks the first and second assemblies from one another;
    wherein the first assembly comprises a hollow tube and the second assembly comprises a tube slidably insertable into the hollow tube of the first assembly.

2. The stake pocket utility system of claim 1, wherein the locking member of the first assembly is movable between a retracted unlocked position and a biased extended locked position.

3. The stake pocket utility system of claim 2, wherein the locking member comprises a pair of oppositely disposed locking members each biased outwardly towards a locked position by a leaf spring.

4. The stake pocket utility system of claim 2, wherein the locking member is moved into a retracted unlocked position as a sloping wall of the locking member engages a wall or rim of the stake pocket and into an extended and locked position when an upper ledge of the locking member engages the wall or rim of the stake pocket.

5. The stake pocket utility system of claim 1, wherein the tab is moved from the retracted position as the second assembly is inserted into the first assembly to the extended and locked position as the tab aligns with the corresponding locking aperture of the first assembly.

6. The stake pocket utility system of claim 5, wherein the tab is spring-biased outwardly towards the locked position.

7. The stake pocket utility system of claim 6, wherein the tab comprises a pair of oppositely disposed tabs connected to a leaf spring.

8. The stake pocket utility system of claim 1, wherein the tab comprises spaced apart first and second sets of tabs, the first and second sets of tabs each comprising oppositely disposed spring-biased tabs.

9. The stake pocket utility system of claim 8, wherein the second assembly includes the first and second sets of tabs and the first assembly includes first and second sets of spaced apart apertures configured to respectively receive the first and second sets of tabs.

10. The stake pocket utility system of claim 1, including a manually actuated release that unlocks the first assembly from the stake pocket.

11. A stake pocket utility system, comprising:
    a first tubular assembly including at least one spring-biased locking member movable between a retracted unlocked position and a biased extended locked position engageable with a stake pocket to detachably connect the first assembly to the stake pocket;
    a second tubular assembly slidably insertable into the first assembly, the second assembly having a spring-biased tab movable between a retracted unlocked position as the second assembly is slid into the first assembly and an extended locked position as the tab aligns with a corresponding locking aperture of the first assembly and extends through the locking aperture to lock the first and second assemblies to one another; and
    a manually actuated latch that unlocks the first and second assemblies from one another.

12. The stake pocket utility system of claim 11, wherein the locking member comprises a pair of oppositely disposed locking members each biased outwardly towards a locked position by a leaf spring.

13. The stake pocket utility system of claim 11, wherein the locking member is moved into a retracted unlocked position as a sloping wall of the locking member engages a wall or rim of the stake pocket and into an extended and locked position when an upper ledge of the locking member engages the wall or rim of the stake pocket.

14. The stake pocket utility system of claim 11, wherein the tab comprises a pair of oppositely disposed tabs connected to a leaf spring.

15. The stake pocket utility system of claim 11, wherein the tab comprises spaced apart first and second sets of tabs, the first and second sets of tabs each comprising oppositely disposed spring-biased tabs.

16. The stake pocket utility system of claim 15, wherein the first assembly includes first and second sets of spaced apart apertures configured to respectively receive the first and second sets of tabs.

17. The stake pocket utility system of claim 11, including a manually actuated release that unlocks the first assembly from the stake pocket.

18. A stake pocket utility system, comprising:
    a first tubular assembly including at least one spring-biased locking member movable between a retracted unlocked position and a biased extended locked position engageable with a stake pocket to detachably connect the first assembly to the stake pocket;
    a second tubular assembly slidably insertable into the first assembly, the second assembly having a spring-biased tab movable between a retracted unlocked position as the second assembly is slid into the first assembly and an extended locked position as the tab aligns with a corresponding locking aperture of the first assembly and extends through the locking aperture to lock the first and second assemblies to one another;
    a release comprising a manually actuated finger hold for unlocking the first assembly from the stake pocket; and
    a latch comprising a manually actuated push button for unlocking the first and second assemblies from one another.

* * * * *